(12) United States Patent
Li et al.

(10) Patent No.: US 11,474,775 B2
(45) Date of Patent: Oct. 18, 2022

(54) SOUND EFFECT ADJUSTMENT METHOD, DEVICE, ELECTRONIC DEVICE AND STORAGE MEDIUM

(71) Applicant: GUANGDONG OPPO MOBILE TELECOMMUNICATIONS CORP., LTD., Guangdong (CN)

(72) Inventors: Yajun Li, Guangdong (CN); Wenhua Leng, Guangdong (CN); Zhaoan Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/191,339

(22) Filed: Mar. 3, 2021

(65) Prior Publication Data

US 2021/0286586 A1 Sep. 16, 2021

Related U.S. Application Data

(63) Continuation-in-part of application No. PCT/CN2019/095139, filed on Jul. 8, 2019.

(30) Foreign Application Priority Data

Sep. 4, 2018 (CN) .......................... 201811028120.7

(51) Int. Cl.
G06F 3/16 (2006.01)
H04S 3/00 (2006.01)
H04S 7/00 (2006.01)

(52) U.S. Cl.
CPC .............. *G06F 3/165* (2013.01); *H04S 3/008* (2013.01); *H04S 7/30* (2013.01); *H04S 2400/01* (2013.01); *H04S 2400/13* (2013.01)

(58) Field of Classification Search
CPC .... H04S 7/30; H04S 2400/13; H04S 2400/01; G06F 3/165
(Continued)

(56) References Cited

U.S. PATENT DOCUMENTS

2014/0285312 A1* 9/2014 Laaksonen .............. H04S 7/302
340/4.42
2017/0148438 A1 5/2017 Deetz et al.
(Continued)

FOREIGN PATENT DOCUMENTS

CN 103458019 12/2013
CN 104199632 * 12/2014 ............... G06F 3/16
(Continued)

OTHER PUBLICATIONS

EPO, European Search Report for EP Application No. 19857317.2, dated Sep. 28, 2021.
(Continued)

*Primary Examiner* — Yosef K Laekemariam
(74) *Attorney, Agent, or Firm* — Hodgson Russ LLP

(57) ABSTRACT

A sound effect adjustment method, device, electronic device, and storage medium are provided. The sound effect adjustment method can be applied to an electronic device. The method includes: detecting whether at least one target application is running on a current electronic device, wherein the current electronic device is capable of outputting audio sounds when the target application runs; determining at least one reference electronic device corresponding to the current electronic device when running the target application; obtaining sound effect parameters configured by the reference electronic device when running the target application; and adjusting, based on the sound effect parameters, output sound effects of the current electronic device when running the target application.

18 Claims, 6 Drawing Sheets

(58) Field of Classification Search
USPC .......................... 381/61, 94.2, 119, 303, 411
See application file for complete search history.

(56) References Cited

U.S. PATENT DOCUMENTS

| | | |
|---|---|---|
| 2017/0192740 A1 | 7/2017 | Armstrong et al. |
| 2018/0074781 A1 | 3/2018 | Wan et al. |
| 2018/0074783 A1 | 3/2018 | Jang |

FOREIGN PATENT DOCUMENTS

| | | | | |
|---|---|---|---|---|
| CN | 104883642 | | 9/2015 | |
| CN | 106095386 | | 11/2016 | |
| CN | 106201418 | | 12/2016 | |
| CN | 108462895 | * | 2/2017 | ........... H04N 21/439 |
| CN | 106534484 | | 3/2017 | |
| CN | 107819958 | | 3/2018 | |
| CN | 108055403 | | 5/2018 | |
| CN | 108462895 | | 8/2018 | |
| EP | 2150078 | | 2/2010 | |
| WO | 2018041801 | | 3/2018 | |

OTHER PUBLICATIONS

SIPO, First Office Action for CN Application No. 201811028120.7, dated Dec. 26, 2019.
SIPO, Second Office Action for CN Application No. 201811028120.7, dated May 28, 2020.
SIPO, Office Action issued for CN Application No. 201811028120.7, Jul. 31, 2020.
WIPO, International Search Report for PCT application No. PCT/CN2019/095139, dated Sep. 29, 2019.

* cited by examiner

S231A

It is determined that whether the multiple other electronic devices include any electronic device that is running the at least one target application.

S232A

At least one electronic device, which is running the at least one application, is determined as the at least one reference device when the multiple other electronic devices include at least one electronic device that is running the at least one target application.

One or more of the multiple other electronic devices, which are closest to the current electronic device, can be obtained.

S232B

The one or more electronic device of the multiple other electronic devices, which are closest to the current electronic device, can be determined as the at least one reference device.

FIG. 4

SOUND EFFECT ADJUSTMENT METHOD, DEVICE, ELECTRONIC DEVICE AND STORAGE MEDIUM

CROSS-REFERENCE TO RELATED APPLICATIONS

This application is a continuation-in-part of International Application No. PCT/CN2019/095139, filed on Jul. 8, 2018, which claims priority to Chinese Patent Application No. 2018110281207, filed on Sep. 4, 2018. The entire disclosures of the above-identified applications are incorporated by reference herein.

TECHNICAL FIELD

The present disclosure relates to the field of electronic devices in general. More particularly, and without limitation, the disclosed embodiments relate to a sound effect adjustment method, device, electronic device and storage medium.

BACKGROUND

With the development of science and electronic technology, electronic devices have become one of the most widely used electronic products in people's daily lives. In addition, users often use the electronic devices to listen to music, watch videos, or play games.

SUMMARY

In view of the above problems, the present disclosure provides a sound effect adjustment method, device, electronic device, and storage medium to solve the above problems.

In the first aspect, a sound effect adjustment method can be provided in accordance with an embodiment of the present disclosure. The sound effect adjustment method can be applied to an electronic device. The method includes: detecting whether at least one target application is running on a current electronic device, wherein the current electronic device is capable of outputting audio sounds when the target application runs; determining at least one reference electronic device corresponding to the current electronic device when running the target application; acquiring sound effect parameters configured by the reference electronic device when running the target application; and adjusting, basing on the sound effect parameters, output sound effects of the current electronic device when running the target application.

In a second aspect, an electronic device can be provided in accordance with an embodiment of the present disclosure. The electronic device can include a processor, an audio output module, coupled to the processor, and a memory coupled to the processor. The memory stores at least one instruction; the at least one instruction is executable by the processor to perform the method can includes: detecting whether a current electronic device is running a target application, wherein the current electronic device is capable of outputting audio sounds when the target application runs on the current electronic device; determining at least one reference electronic device corresponding to the current electronic device when running the target application; obtaining sound effect parameters configured by the reference electronic device when running the target application; acquiring, basing on the sound effect parameters, sound effect data for output sound effects to be output by the current electronic device that is running the target application; and outputting the sound effect data for the output sound effects to the audio output module.

In a fourth aspect, a computer-readable storage medium can be provided in accordance with an embodiment of the present disclosure. The computer readable medium stores at least one instruction, and the at least one instruction can be loaded and executed by a processor to perform the sound effect adjustment method as above-mentioned.

BRIEF DESCRIPTION OF THE DRAWINGS

In order to explain the technical solutions in the embodiments of the present disclosure or the prior art more clearly, the drawings used in the description of the embodiments or the prior art are briefly introduced below. Obviously, the drawings in the following description are merely some embodiments of the present disclosure. For those of ordinary skilled in the art, other drawings can be obtained according to these drawings without paying creative labor.

FIG. 3 illustrates a schematic flowchart of a block S230 of the sound effect adjustment method in FIG. 2, in accordance with an embodiment of the present disclosure.

FIG. 4 illustrates a schematic flowchart of a block S230 of the sound effect adjustment method in FIG. 2, in accordance with another embodiment of the present disclosure.

DETAILED DESCRIPTION OF EMBODIMENTS

Figure 1:
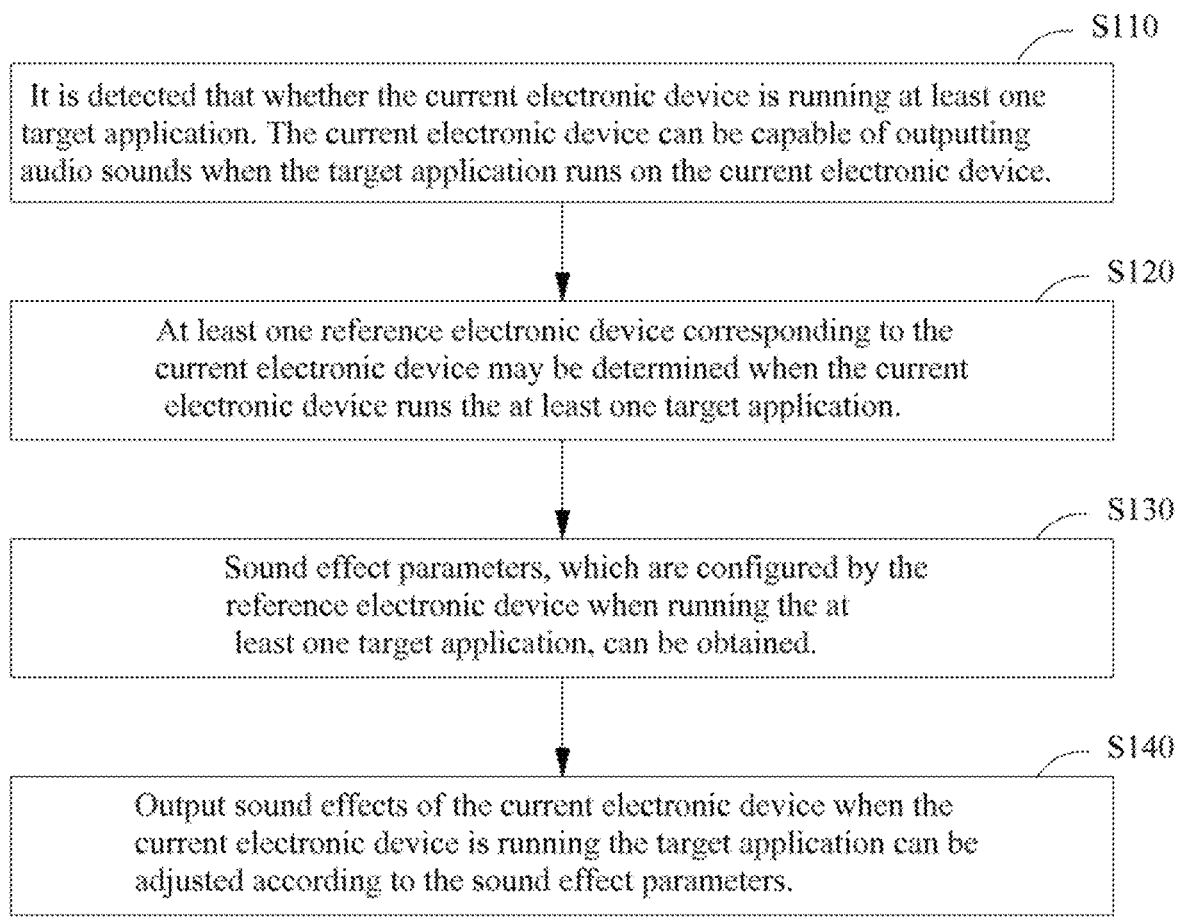
FIG. 1 illustrates a schematic flowchart of a sound effect adjustment method, in accordance with an embodiment of the present disclosure.

In order to enable those skilled in the art to better understand the solutions of the present disclosure, the technical solutions in the embodiments of the present disclosure will be described clearly and completely in conjunction with the accompanying drawings, in accordance with the embodiments of the present disclosure.

As used herein, a "communication terminal", "electronic device" or simply a "terminal") includes, but is not limited to, a device that is configured to receive/transmit communication signals via a wire line connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. A communication terminal or an electronic device that is configured to communicate over a wireless interface may be referred to as a "wireless communication terminal," a "wireless terminal" and/or a "mobile terminal." Examples of mobile terminals and electronic devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

At present, users have higher and higher requirements for electronic devices. Therefore, in order to meet the requirements of users and bring convenience for users, electronic devices have begun to be capable of playing audio data. An audio framework of an electronic device employs a processor and a built-in audio CODEC, which is similar to that of computers. In some embodiments, the processor may convert an audio data into I2S signals after receives the audio data that is input to the processor. The I2S signals is then transmitted to the CODEC. The CODEC then converts the I2S signals to analog signals, and then the analog signals are played.

The present disclosure pertains to techniques for presenting sound effects at electronic device such as a portable media device. The sound effects can be output as audio sounds to an internal speaker, an external speaker, or both. In addition, the audio sounds for the sound effects can be output together with other audio sounds pertaining to media assets. In one embodiment, the sound effects can serve to provide auditory feedback to a user of the electronic device. The electronic device may include a user interface that can facilitate a user's selection of sound effect usages, types or characteristics.

Furthermore, in order to improve the listening experience of the users, more and more users are beginning to raise requirements on output sound effects of the electronic device. The output sound effects can refer to a sound with a specific effects created, which indicates noise or sounds that are added to vocal cord for enhancing a realism, an atmosphere, or drama information of a current scene. The output sound effects also indicates sounds that is artificially created or enhanced, which is used to enhance a sound processing of art or other content in movies, video games, music or other medias. For example, output sound effects of a video game may refer to sounds of percussion, running, gunfire, etc. in the video game. For example, the output sound effects may correspond to sounds (actual or synthetic) for mouse clicks, button presses, icon touches, and the like. Therefore, with the development of electronic device technology, more and more electronic devices begin to support for the output sound effects. However, the function of outputting the output sound effects of the electronic device is mainly achieved by the user manually selecting and configuring a sound effect mode for a certain scene according to their own preferences, which is ordinary and unalterable, and without considering the influence of external factors, and results in an unalterable output sound effects.

In response to the above problems, the inventor of present disclosure has discovered for a long-term research, and provides a sound effect adjustment method, device, electronic device, and storage medium, in accordance with the embodiments of the present disclosure, in which the output sound effects of the current electronic device can be adjusted, according to sound effect parameters of other electronic devices that are in a correspondence relationship with the current electronic device. The output sound effects of the current electronic devices can be quickly, automatically and accurately configured, which can improve an effect of the output sound effects and user experience. The sound effect adjustment method is described in detail in the following embodiments.

As illustrated in FIG. 1, FIG. 1 illustrates a schematic flowchart of a sound effect adjustment method, in accordance with an embodiment of the present disclosure. The sound effect adjustment method is performed to adjust output sound effects of a current electronic device according to sound effect parameters of other electronic devices that have a corresponding relationship with the current electronic device, so that the output sound effects of the current electronic device can be quickly, automatically and accurately configured, which can improve an effect of the output sound effects and user experience. In a specific embodiment, the sound effect adjustment method is applied to a sound effect adjustment device 200 illustrated in FIG. 7 and an electronic device 100 (FIG. 8) employing the sound effect adjustment device 200. The following will take an electronic device as an example to describe the operations of this embodiment. Of course, it is understandable that the electronic device in the illustrated embodiment may be a smart phone, a tablet computer, a wearable electronic device, an in-vehicle device, a gateway, etc., which is not limited here. The following will elaborate on the operations illustrated in FIG. 1, and the sound effect adjustment method may begin at block S110.

At block S110, it is detected that whether the current electronic device is running at least one target application. The current electronic device can be capable of outputting audio sounds when the target application runs on the current electronic device.

In the embodiments of the present disclosure, an application is, for example, a software application that runs on the electronic device. The application has access to audio data and sound effect data for the output sound effects. The application can utilize the audio data when the application desires to output the audio data. The current electronic device may include audio output module for outputting audio sounds. The audio output module can be a hardware component that is capable of producing a sound, such as a sound effect. For example, the audio output module can pertain to a speaker or piezoelectric module that can be briefly activated to provide a sound effect. The target application may transmit audio data to the audio output module when runs on the current electronic device, so that the current electronic device can output audio sounds according to the audio data when the target application runs on the current electronic device.

In some embodiments, the application can control when a sound effect is to be output. The application also understands that it may or may not already be outputting audio data at the time at which a sound effect is to be output. For example, the application can control the audio output module.

In the illustrated embodiment, the current electronic device may run one or more applications including an application running on the foreground of the current electronic device, an application running on the background of the current electronic device, or an application that can be switched to run in the foreground and background of the current electronic device, which is not limited here. In some embodiments, the application running on the foreground may refer to an application that can usually interact with a user and can run in the foreground, and it will be suspended when it is not visible (such as a video game). The application running on the background may refer to an application that can barely interact with the user, except for in a configuration duration of the application, the application is hidden in other times of its lifetime (for example: an automatic reply application of SMS and an alarm clock application). The application that can be switched to run in the foreground and background of the current electronic device, may refer to the application that can run in the foreground and the background by switching casually. Understandably, when the application is not killed, it means that the application is running on the electronic device.

Further, the current electronic device can run only one application, or can run multiple applications at the same time. When the current electronic device runs only one application, the application can run in the foreground of the current electronic device, or in the background of the current electronic device, or by switching between the foreground and background of the current electronic device. When the current electronic device is running multiple applications at the same time, the multiple applications can all run in the background of the current electronic device; or, one of the multiple applications can run in the foreground of the current electronic device, while the other applications can run in the background of the current electronic device; or, one of the multiple applications by switching between the foreground and background of the current electronic device, while the other applications can run in the background of the current electronic device, which are not limited here.

After the current electronic device is determined to run at least one application, at least one target application may be selected from the at least one application. Similarly, the at least one target application may include one or more applications, which is not limited here. In the illustrated embodiment, the target application can output audio data for audio sounds to the audio output module when operating. That is, outputs of the target application may include at least audio output. For example, the at least one target application may include a music player application, a video player application, a call application, a game application, etc. The target application can output audio data, or it can output audio data and image data at the same time. Correspondingly, the current electronic device is capable of outputting audio sounds and image when the at least one target application is outputting the audio data and the image data while running on the current electronic device At block S120, at least one reference electronic device corresponding to the current electronic device may be determined when the current electronic device runs the at least one target application.

In the illustrated embodiment, when it is determined that the current electronic device is running the at least one target application, it indicates that the current electronic device is outputting audio sounds or will output audio sounds at a certain time in the future. Therefore, for an example, the operation determining the at least one reference electronic device corresponding to the current electronic device may be performed when the current electronic device is running the at least one target application. For another example, it is determined that whether the current electronic device is outputting audio sounds, and the operation determining the at least one reference electronic device corresponding to the current electronic device may be performed when the current electronic device is outputting audio sounds.

In some embodiments, when the target application is a music player application, or a video player application, or a call application, or other application that can output audio data for audio sounds to the audio output module when operating, it can be determined that the current electronic device is running the target application and outputting audio sounds, and then the operation determining the at least one reference electronic device corresponding to the current electronic device can be performed. When the target application is a game application, or an instant messaging application, or other application that may output audio data for audio sounds to the audio output module when operating, firstly it is detected that whether the current electronic device is outputting audio sounds, and then the operation determining the at least one reference electronic device corresponding to the current electronic device can be performed when it is detected that the current electronic device is outputting audio sounds. In the illustrated embodiment, the following will take an instant messaging application as an example for description. The instant messaging application may include WeChat, or QQ, etc. Taking a WeChat as an example, the WeChat can output audio data when operating, such as in voice chatting or video chatting. On the other hand, the WeChat may not output audio data when operating, such as in text chatting. Therefore, when the current electronic device runs such a target application, the reference electronic device corresponding to the current electronic device may be determined after the current electronic device is determined to output audio sounds in advanced.

Further, at least one electronic device, which is corresponding to the current electronic device, of a plurality of electronic devices, may be determined as the reference electronic device. In one embodiment, the at least one electronic device with the same model number as the current electronic device can be determined as the reference electronic device; the at least one electronic device in the same network as the current electronic device can be determined as the reference electronic device; the at least one electronic device, a distance between which and the current electronic device is equal to a predetermined distance, may be determined as the reference electronic device; at least one electronic device that previously associated with the current electronic device may be determined as the reference electronic device; or at least one electronic device running the same target application as the current electronic device may be determined as the reference electronic device, which is not limited here. The reference electronic device may also be a smart phone, a tablet computer, a wearable electronic device, an in-vehicle device, a gateway, etc., which is not limited here.

At block S130, sound effect parameters, which are configured by the reference electronic device when running the at least one target application, can be obtained.

Further, after the reference electronic device is determined, the sound effect parameters, which are configured by the reference electronic device when running the at least one target application, can be obtained. For example, a volume value, a frequency value, a power value, etc., which are configured by the reference electronic device when the reference electronic device is running the target application, may be obtained. The sound effect parameters are not limited here. In some embodiments, the sound effect parameters may include audio characteristics for the output sound effects. The audio characteristics pertain to metadata corresponding to the audio data for the output sound effects being output. The audio characteristics can pertain to one or more of: audio resolution (e.g., bit depth), sample rate, and stereo/mono.

In some embodiments, as a first example, after the reference electronic device is determined, the sound effect parameters, which was previously configured by the reference electronic device when the target application run the last time, can be obtained and determined as the sound effect parameters that are configured by the reference electronic device when running the at least one target application. It is understandable that when the reference electronic device is running the target application, the sound effect parameters that are currently configured can be obtained; when the reference electronic device is not running the target application, the sound effect parameters, which was previously configured by the reference electronic device when the target application was operating the last time, can be obtained.

As a second example, after the reference electronic device is determined, historical sound effect parameters configured by the reference electronic device for the target application can be obtained. Sound effect parameters which is the most frequently configured, or an average value of sound effect parameters which is configured by a user in the past, can be obtained based on the historical sound effect parameters, and can be determined as the sound effect parameters configured by the reference electronic device when running the at least one target application. In one embodiment, sound effect parameters configured by the reference electronic device, a times of running the target application of which falls in the predetermined number of times in the past, can be respectively obtained, and the sound effect parameters that were most frequently configured within the predetermined number of times in the past, or the average value of the sound effect parameters configured within the predetermined number of times, can be obtained. In other embodiments, the sound effect parameters configured by the reference electronic device in a past predetermined period may be obtained respectively, and then the most frequently configured sound effect parameters in the past predetermined period, or the average value of the sound effect parameters configured in the past predetermined period, can be obtained.

At block S140, output sound effects of the current electronic device when running the target application can be adjusted according to the sound effect parameters.

In the illustrated embodiment, because there is a corresponding relationship between the current electronic device and the reference electronic device, the sound effect parameters of the reference electronic device may be determined as the sound effect parameters of the current electronic device after the sound effect parameters of the reference electronic device are obtained. And then the output sound effects of the current electronic device when running the target application can be adjusted according to the sound effect parameters of the reference electronic device. Taking a volume value of the sound effect parameters as an example, when a volume value included in the sound effect parameters of the reference electronic device is greater than an output volume value of the current electronic device running the target application, the output volume value of the current electronic device running the target application can be increased, according to a difference between the volume value of the reference electronic device and the output volume value of the current electronic device. So that the output volume value of the current electronic device is equal to the volume value of the reference electronic device that is running the target application.

Conversely, when the volume value included in the sound effect parameters of the reference electronic device is smaller than the output volume value of the current electronic device running the target application, the output volume value of the current electronic device running the target application can be decreased, according to a difference between the volume value of the reference electronic device and the output volume value of the current electronic device. So that the output volume value of the current electronic device is equal to the volume value of the reference electronic device that is running the target application. Therefore, the output sound effects of the current electronic device can be adjusted according to the sound effect parameters of the reference electronic device. The output sound effects of the current electronic device can be configured quickly, automatically and accurately, and the effect of the output sound effects and the user experience can be improved.

In some embodiments, a desired sound effect to be output is determined by adjusting and/or modifying a sound effect data for the output sound effects. The sound effect data can represent audio sounds pertaining to the output sound effects that can be utilized by the electronic device. For example, the output sound effects may correspond to sounds (actual or synthetic) for mouse clicks, button presses, icon touches, and the like. The output sound affect can serve to inform the user of the electronic device of a condition, status or event. The sound effect data is audio data and can be stored in a wide variety of formats. For example, the sound effect data a can be simply Pulse Coded Modulation (PCM) data or can be encoded data, such as MP or MPEG-format. PCM data is typically either raw data (e.g., a block of samples) or formatted (e.g., WAV or AIFF file formats).

In some embodiments, the sound effect data may be modified according to the obtained at least one sound effect parameter. The sound effect parameters may include audio characteristics pertaining to metadata corresponding to the audio data for the output sound effects. The audio characteristics can pertain to one or more of: audio resolution (e.g., bit depth), sample rate, and stereo/mono.

For an example, the sound effect data can be modified, such as to change audio resolution or sample rate conversion according to the at least one sound effect parameter. In particular, the sample rate for the sound effect data can be modified based on the sample rate of the at least one sound effect parameter. After the sound effect data has been modified, the modified sound effect data is then transmitted to the audio output module (e.g. a speaker), the audio output module may convert the modified sound effect data to analogue data and the desired output sound effects is output.

For another example, the target application may be associated with an original audio data. The original audio data presents output sounds for the target application, such as a background music for the target application. The target application may transmit the original audio data to the audio output module, such that the audio output module may output the background music of the target application. The output sound effects may be mixed with the output sounds (e.g., the back ground music) for the target application when the output sound effects are activated. In some embodiments, the sound effect data may be modified to match a desire audio resolution (e.g., bit depth) of the original audio data associating with the target application. The sample rate for the sound effect data can be modified based on the sample rate of the original audio data. After the sound effect data has been modified, the modified sound effect data is then mixed with the original audio data associating with the target application. Thereafter, the mixed audio data is output to the audio output module associated with the current electronic device, thus the desired output sound effects is output.

In the illustrated embodiment, the electronic device can support a plurality of different output sound effects. The electronic device is configured to determine which of the output sound effects is the desired output sound effects by analyzing the sound effect parameters. In the sound effect adjustment method, in accordance with an embodiment of the present disclosure, it is detected that whether the current electronic device is running at least one target application. The current electronic device can be capable of outputting audio sounds when the target application runs on the current electronic device. At least one reference electronic device corresponding to the current electronic device may be determined when the current electronic device runs the at least one target application. Sound effect parameters, which are configured by the reference electronic device when running the at least one target application, can be obtained. Output sound effects of the current electronic device when running the target application can be adjusted according to the sound effect parameters of the reference electronic device. Therefore, the output sound effects of the current electronic device can be adjusted according to the sound effect parameters of the reference electronic device that in a corresponding relationship of the current electronic device. So that the output sound effects of the electronic device can be configured quickly, automatically and accurately, and the effect of the output sound effects and the user experience can be improved.

Figure 2:
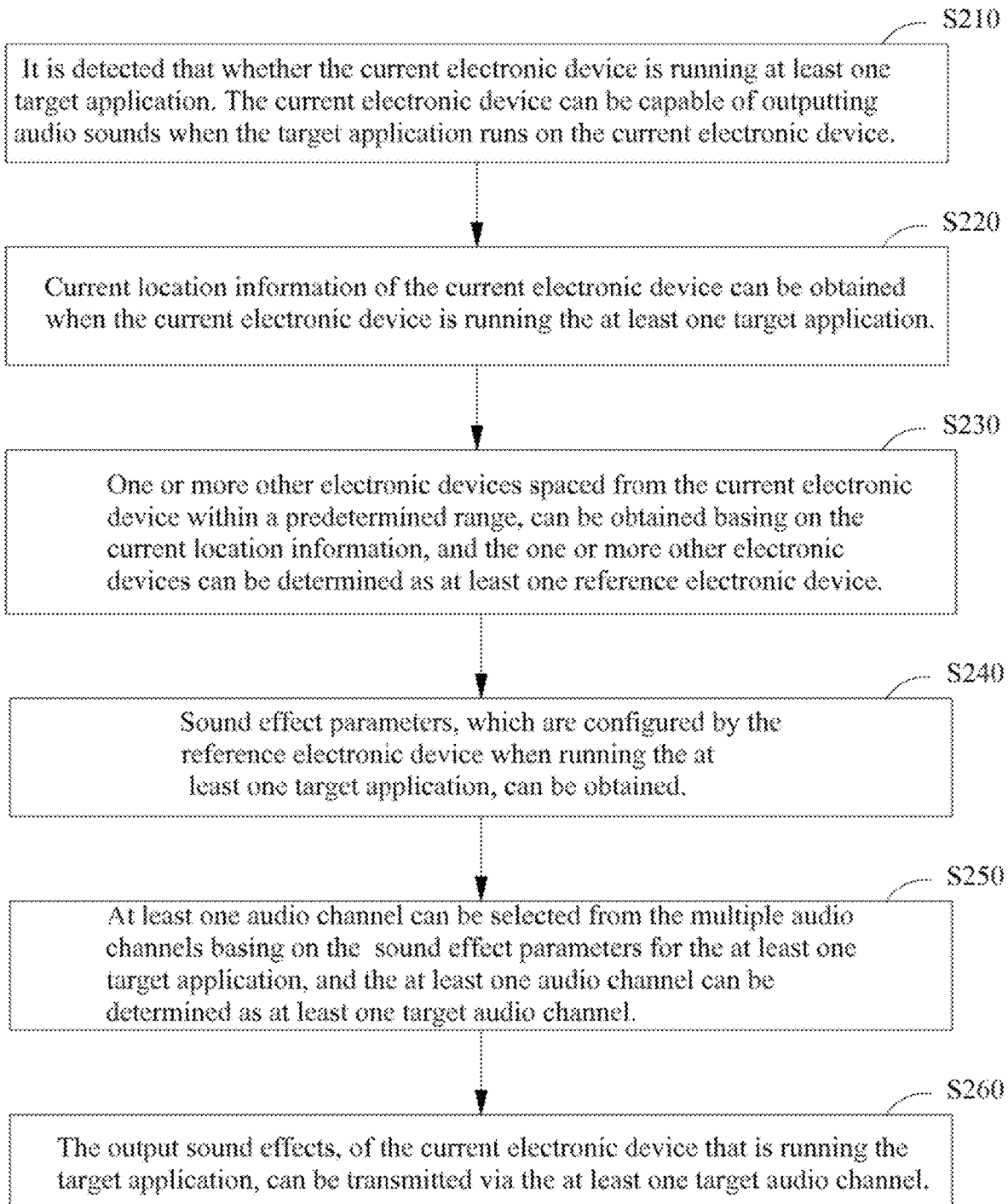
FIG. 2 illustrates a schematic flowchart of a sound effect adjustment method, in accordance with another embodiment of the present disclosure.

As illustrated in FIG. 2, FIG. 2 illustrates a schematic flowchart of a sound effect adjustment method, in accordance with another embodiment of the present disclosure. The sound effect adjustment method is applied to the abovementioned electronic device. In the illustrated embodiment, the current electronic device is provided with multiple audio channels. Each one of the multiple audio channels is configured with an audio effect processing algorithm that is different from audio effect processing algorithms of other audio channels. The following will elaborate on the operations illustrated in FIG. 2, and the sound effect adjustment method may begin at block S210.

At block S210, it is detected that whether the current electronic device is running at least one target application. The current electronic device can be capable of outputting audio sounds when the target application runs on the current electronic device.

The detail description of block S210 can refer to that illustrated in block S110, which will not be repeated here.

At block S220, current location information of the current electronic device can be obtained when running the at least one target application.

In the illustrated embodiment, an electronic device, a distance between which and the current electronic device is equal to a predetermined distance, may be determined as the reference electronic device. In some embodiments, the current location information of the current electronic device is firstly determined when the current electronic device is running the target application. The current location information of the current electronic device can be obtained by positioning. For an example, current location information of the current electronic device can be obtained via a location-based service (LBS) and/or a global positioning system (GPS). It is understandable that because a location of the current electronic device may change at any time, in the illustrated embodiment, the current location information of the current electronic device is obtained in real time, so that the LBS and/or GPS can obtain the current location information in real time according to the changed location of the current electronic device when the location of the current electronic device changes.

At block S230, one or more other electronic devices spaced from the current electronic device within a predetermined range, can be obtained basing on the current location information, and the one or more other electronic devices can be determined as at least one reference electronic device.

Further, after the current location information of the current electronic device is determined, one or more other electronic devices spaced from the current electronic device within a predetermined range, can be obtained. In one embodiment, one or more other electronic devices spaced from the current electronic device within the predetermined range, can be obtained according to the current location information of the current electronic device. The predetermined range can be manually configured by the user, and can be configured by the current electronic device before leaving the factory, or can be configured by the current electronic device according to the environment thereof, which is not limited here. The predetermined range can be 1 km, 2 km, etc., which is not limited here.

For an example, the predetermined range can be configured by the current electronic device according to the environment thereof. In some embodiments, environmental conditions within the predetermined range of the current location information can be obtained after the current location information of the current electronic device is obtained, and a prosperity index of the surroundings of the current location information can be determined based on the environmental conditions. For example, the predetermined range may be set as a relatively wide range when the current location locates in a relatively remote area. The predetermined range may be set as a relatively narrow range when the current location locates in a relatively prosperous area. In one embodiment, it is determined that the current location belongs to the relatively remote area when search times for the current location is less than a predetermined number of times. It is determined that the current location belongs to the relatively prosperous area when search times for the current location is more than the predetermined number. It is understandable that the predetermined range can be sorted according to search times, that is, the more search times, the narrower the predetermined range is set, and the fewer search times, the wider the predetermined range is set.

The predetermined threshold defines a predetermined area surrounding the current location of the current electronic device. A distance between each position in the predetermined area and the current electronic device is smaller than the predetermined threshold. In the illustrated embodiment, one or more other electronic devices in the predetermined area, can be correspondingly obtained after the predetermined threshold is determined. In one embodiment, there may be one or more other electronic devices located in the predetermined area, which is not limited here. When there is one other electronic device located in the predetermined area, the one electronic device is determined as the at least one reference electronic device. When there are multiple other electronic devices located in the predetermined area, one or more of the other electronic devices can be selected from the multiple other electronic devices to be determined as the at least one reference electronic device, which is not limited here. In some embodiments, one or more predetermined thresholds are configured for defining one or more predetermined area surrounding the current location of the current electronic device.

In some illustrated embodiments, the search times indicates the number of times that the information associated with the current location information is searched for, on the current electronic device or on a server that is in communication with the current electronic device. The information associated with the current location information may refer to relating positions spaced from the current location information within a preset range. For example, the information associated with the current location information may include a school, a hospital, a street, a park, a shopping center, a road, a market, etc., which is spaced from the current location information within a preset range. Such information may be searched for on the current electronic device or on a server that is in communication with the current electronic device. Therefore, the prosperity index of the surroundings of the current location information can be determined based on the search times for the information associated with the current location information.

Thus, the block S230 may include: obtaining search times for the current location; when the search times is less than a predetermined number of times, determining a first predetermined range, obtaining one or more other electronic devices spaced from the current electronic device within the first predetermined range, and determining the one or more other electronic device as the at least one reference electronic device; when the search times is greater than the predetermined number of times, determining a second predetermined range, obtaining one or more other electronic devices spaced from the current electronic device within the second predetermined range, and determining the one or more other electronic device as the at least one reference electronic device; wherein the first predetermined range is greater than the first predetermined range.

As illustrated in FIG. 3, FIG. 3 illustrates a schematic flowchart of the block S230 of the sound effect adjustment method in FIG. 2, in accordance with one embodiment of the present disclosure. The following will elaborate on the operations illustrated in FIG. 3. In the illustrated embodiment, the number of the other electronic devices is more than one, and the method may specifically begin at block S231A.

At block S231A, it is determined that whether the multiple other electronic devices include any electronic device that is running the at least one target application.

In one embodiment, operating statuses of the multiple other electronic devices can be obtained when there are multiple other electronic devices. It is understandable that the operating statuses may include whether the other electronic devices are running any application and whether the application running on the other electronic devices includes the at least one target application. When the electronic device is running the application, it can transmit an information including the operating statuses thereof to a server, to inform the server of the operating status, or to obtain a corresponding request data from the server. The server can transmit the information including the operating statuses of the other electronic devices to the current electronic device when receives the information. The current electronic device can obtain the operating statuses of other electronic devices based on the information, so that it can determine whether the multiple other applications include any electronic device that is running the target application.

At block S232A, at least one electronic device, which is running the at least one application, is determined as the at least one reference device when the multiple other electronic devices include at least one electronic device that is running the at least one target application.

Wherein, when a determination result indicates that he multiple other electronic devices include at least one electronic device that is running the at least one target application, the at least one electronic device that is running the at least one target application is determined as the at least one reference electronic device. It is understandable that by this way, the reference electronic device is adjacent to the current electronic device, and the reference electronic device is running the target application, therefore, it is reasonable for determining the sound effect parameters configured by the reference electronic device that is running the target application as the sound effect parameters of the current electronic device when running the target application, which is more easier to meet user needs.

In one embodiment, only one electronic device of the multiple other electronic devices may be running the target application, or multiple electronic devices may be running the target application, which is not limited here. When there is only one electronic device running the target application, the one electronic device is determined as the at least one reference electronic device. In some embodiments, when there are multiple electronic devices running the target application, one of the multiple electronic devices can be randomly selected from the multiple electronic devices and determined as the at least one reference electronic device. In other embodiments, when there are multiple electronic devices running the target application, the multiple electronic devices that are running the target application can be all determined as the at least one reference electronic devices, and the sound effect parameters of each of the multiple electronic devices that are running the target application, are combined to obtain the sound effect parameters of the at least one reference electronic device.

As illustrated in FIG. 4, FIG. 4 illustrates a schematic flowchart of the block S230 of the sound effect adjustment method in FIG. 2, in accordance with one embodiment of the present disclosure. The following will elaborate on the operations illustrated in FIG. 4. In the illustrated embodiment, the number of the other electronic devices is more than one, and the method may begin at block S231B.

At block S231B, one or more of the multiple other electronic devices, which are closest to the current electronic device, can be obtained.

In another embodiment, a location information of each of the multiple other electronic devices can be obtained when there are multiple other electronic devices. It is understandable that, current location information of each of the multiple electronic devices can be obtained via the LBS and/or the GBS when the other electronic devices enable location services. Further, the other electronic devices may transmit information including the location information thereof to the server to inform the server of their current location information. The server can transmit the information including the location information of the other electronic devices to the current electronic device when receives the information. The current electronic device can obtain the location information of the other electronic devices basing on the information from the sever, so as to obtain the current location information of each of the multiple other electronic devices.

Further, a distance between the current electronic device and each of the other electronic devices can be obtained basing on the current location information of the current electronic device and the current location information of each of the other electronic devices. One or more of the multiple other electronic devices, which are closest to the current electronic device, can be obtained by comparing the distances between the current electronic device with the multiple other electronic devices.

At block S232B, the one or more electronic device of the multiple other electronic devices, which are closest to the current electronic device, can be determined as the at least one reference device.

In the illustrated embodiment, one or more of the multiple other electronic device, which are closest to the current electronic device, can be determined as the at least one reference device when the one or more electronic devices are determined to be closest to the current electronic device. It is understandable that by this way, an environment, in which the at least one reference electronic device locates in, is similar to an environment, in which the current electronic device locates in. Therefore, it is reasonable for determining the sound effect parameters configured by the reference electronic device that is running the target application as the sound effect parameters of the current electronic device when running the target application, which is easier to meet user needs.

In one embodiment, there may be one or more electronic devices closest to the current electronic device, which is not limited here. When there is only one closest electronic device to the current electronic device, the one electronic device is determined as the reference electronic device. In some embodiments, when there are multiple electronic devices that are evenly closest to the current electronic device, one of the multiple electronic device can be randomly selected from the multiple other electronic devices closest to the current electronic device, and can be determined as the at least one reference electronic device. In other embodiments, when there are multiple electronic devices that are evenly closest to the current electronic device, the multiple electronic devices closest to the current electronic device can be all determined as the at least one reference electronic devices, and the sound effect parameters configured by the multiple electronic devices that are running the target application, are combined to obtain the sound effect parameters of the at least one reference electronic device.

At block S240, sound effect parameters, which are configured by the reference electronic device when running the at least one target application, can be obtained.

The detail description of block S240 can refer to that illustrated in block S130, which will not be repeated here.

Figure 5:
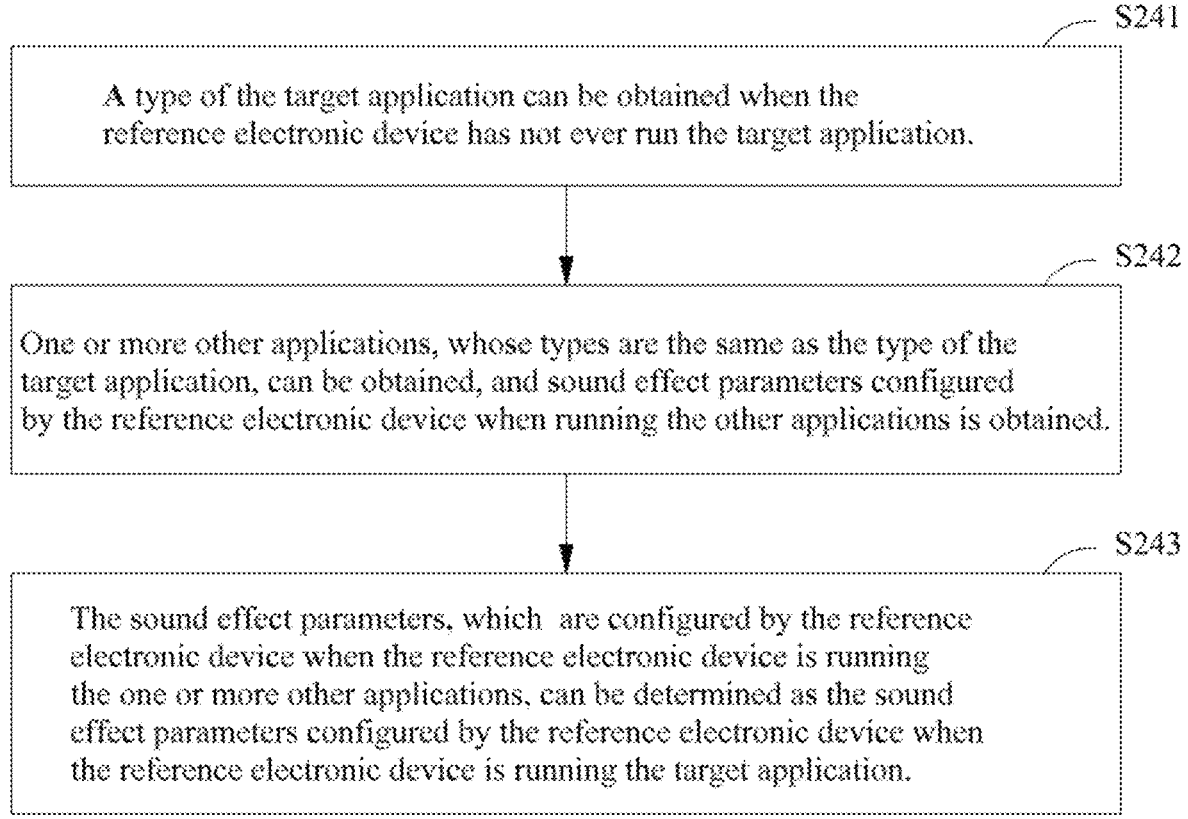
FIG. 5 illustrates a schematic flowchart of a block S240 of the sound effect adjustment method in FIG. 2, in accordance with an embodiment of the present disclosure.

As illustrated in FIG. 5, FIG. 5, illustrates a schematic flowchart of the block S240 of the sound effect adjustment method in FIG. 2, in accordance with one embodiment of the present disclosure. The following will elaborate on the operations illustrated in FIG. 5. In the illustrated embodiment, the number of the other electronic devices is more than one, and the method may begin at block S241.

At block S241, a type of the target application can be obtained when the reference electronic device has not ever run the target application.

In one embodiment, when the reference electronic device has not ever run the target application, that is, when the reference electronic device has not ever installed the target application or has not ever run the target application after installation, the type of the target application can be obtained. The current electronic device can pre-create a mapping relationship of applications and types, and generate and store a mapping relationship table in the current electronic device, as illustrated in Table 1. The applications and the types can be automatically associated to each other by the system of the reference electronic device or manually by the user to create the mapping relationships thereof. For example, the types of the WeChat and QQ can be configured as types of instant messaging application, which are not limited here. In the mapping relationships of the applications and the types, one application can correspond to one type, or multiple applications can correspond to multiple types.

Further, after the target application is determined, the target application is compared with a plurality of pre-stored applications in the mapping relationship table one by one to obtain an application that is matching the target application, and then the type of the target application can be obtained by searching for the type of the application that is matching the target application, according to the mapping relationship table.

TABLE 1

| Application | Type |
|---|---|
| A1 | B1 |
| A2 | B2 |
| A3 | B3 |

At block S242, one or more other applications, whose types are the same as the type of the target application, can be obtained, and sound effect parameters configured by the reference electronic device when running the other applications is obtained.

After the type of the target application is determined, one or more other applications, whose types are the same, are searched for. It is understandable that the types of the other applications included in the type are consistent with the type of the target application. There can be one or more other applications, which is not limited here. Further, it is determined whether the reference electronic device has ever run the one or more other applications. When the at least one reference electronic device has run the one or more other applications, sound effect parameters configured by the reference electronic device when the reference electronic device running the one or more other applications can be correspondingly obtained.

At block S243, the sound effect parameters, which are configured by the reference electronic device when the reference electronic device is running the one or more other applications, can be determined as the sound effect parameters configured by the reference electronic device when the reference electronic device is running the target application.

In the illustrated embodiment, because the type of the target application is the same as that of the one or more other applications, it can be considered that preferred sound effect parameters for the target application may be consistent with preferred sound effect parameters for the one or more other applications. For example, it can be considered that the preferred sound effect parameters for the target application and the preferred sound effect parameters for the one or more other applications can be both determined as M1 when the target application and the other applications are both game applications. It can be considered that the preferred sound effect parameters for the target application and the preferred sound effect parameters for the one or more other applications can be both determined as M2 when the target application and the one or more other applications are both music player applications. Therefore, in the illustrated embodiment, the sound effect parameters, which are configured by the reference electronic device when the reference electronic device is running the other applications, can be determined as the sound effect parameters configured by the reference electronic device when the reference electronic device is running the target application.

When there is one the other application, the sound effect parameters, that is configured by the reference electronic device when the reference electronic device is running the other applications, can be obtained, and can be determined as the sound effect parameters configured by the reference electronic device when running the target application. in some embodiments when there are multiple other applications, one of the multiple other applications can be selected randomly from the multiple other applications, and the sound effect parameters, which are configured when running the other application, can be obtained and determined as the sound effect parameters configured by the reference electronic device when running the target application. In other embodiments, when the number of the other electronic devices is more than one, several other applications can be selected from the multiple other applications, and the sound effect parameters, which are configured by the several other electronic devices when the several other electronic devices are running the several other applications, are combined to obtain the sound effect parameters configured by the reference electronic devices when running the target application.

At block S250, at least one audio channel can be selected from the multiple audio channels basing on the sound effect parameters for the at least one target application, and the at least one audio channel can be determined as at least one target audio channel.

In the illustrated embodiment, the current electronic device is provided with multiple audio channels. Each one of the multiple audio channels is configured with an audio effect processing algorithm that is different from audio effect processing algorithms of other audio channels. In the illustrated embodiments, the audio channel is a virtual channel over which the application can send audio data such that the audio data can be directed to the audio output module. In some embodiments, the current electronic device can respectively configure different scenes with different audio channels basing on existing architecture of an audio system thereof. Different audio data may be send over different audio channels. For example, different sound effect data may be send to the audio output module over different audio channels for outputting different output sound effects. Further, after the sound effect parameters are obtained, the sound effect parameters can be analyzed to obtain sound types for the sound effect parameter. At least one audio channel then can be selected from the multiple audio channels and determined as the at least one target audio channel according to an analysis result. In one embodiment, when the sound effect parameters include only one sound type, only one of the audio channels may be selected and determined as the at least one target audio channel. When the sound effect parameters include multiple sound types, multiple audio channels may be selected and determined as the at least one target audio channel.

The following may take a game application as an example of the at least one target application, the electronic device that running a game application may output audio sounds include sound types such as a percussive sound, a running sound, a gunfire sound, etc. Each of the audio sounds corresponds to a kind of output sound effects. Therefore, several audio channels respectively corresponding to the percussive sound, the running sound, and the gunfire can be selected from the multiple audio channels, and can be determined as several target audio channels for respectively transmitting the percussive sound, the running sound, and the gunfire. So that different sound effect data for different output sound effects can be processed by different sound effect processing algorithms, and the effect for processing is better.

Of course, in the illustrated embodiment, each application can correspond to a specific audio channel, that is to say, one application may correspond to one audio channel. The audio channels corresponding to different applications can be configured with different sound effect processing algorithms according to different applications. The following may take a game application as an example of the at least one target application, basing on the game application, one audio channel can be selected from the multiple audio channels and can be determined as the target audio channel for the game application, for transmitting the output sound effects of the electronic device when the electronic device is running the target application.

At block S260, the output sound effects, of the current electronic device that is running the target application, can be transmitted via the at least one target audio channel.

It is understandable that the at least one target audio channel includes at least one audio channel. When there is one audio channel, an original audio data can be processed by the sound effect processing algorithm corresponding to the audio channel, to obtain a corresponding output sound effects. When there are multiple audio channels, because different audio channels correspond to different sound effect processing algorithms, and the output sound effects, of the current electronic device that is running the target application, is transmitted via the at least one target audio channel, the original audio data can be processed differently by different sound effect processing algorithms to obtain different output sound effects, which may achieve better processing effect.

In the sound effect adjustment method, in accordance with an embodiment of the present disclosure, it is detected that whether the current electronic device is running at least one target application. The current location information of the current electronic device can be obtained when the current electronic device is running the at least one target application. One or more other electronic devices spaced from the current electronic device within a predetermined range, can be obtained basing on the current location information, and the one or more other electronic devices can be determined as at least one reference electronic device. The sound effect parameters, which are configured by the reference electronic device when running the at least one target application, can be obtained. At least one audio channel can be selected from the multiple audio channels basing on the sound effect parameters, and the at least one audio channel can be determined as at least one target audio channel. The output sound effects, of the current electronic device that is running the target application, can be transmitted via the at least one target audio channel. Compared with the sound effect adjustment method illustrated in FIG. 1, in the sound effect adjustment method provided by this embodiment, the reference electronic device can be obtained according to the location information of the electronic device. Such that the sound effect parameters can be determined more accurately by determining the electronic device that is in the same environment of the current electronic device as the reference electronic device. And it is conveniently and quickly for adjusting the output sound effects by providing different audio channels with different sound effect processing algorithms.

Figure 6:
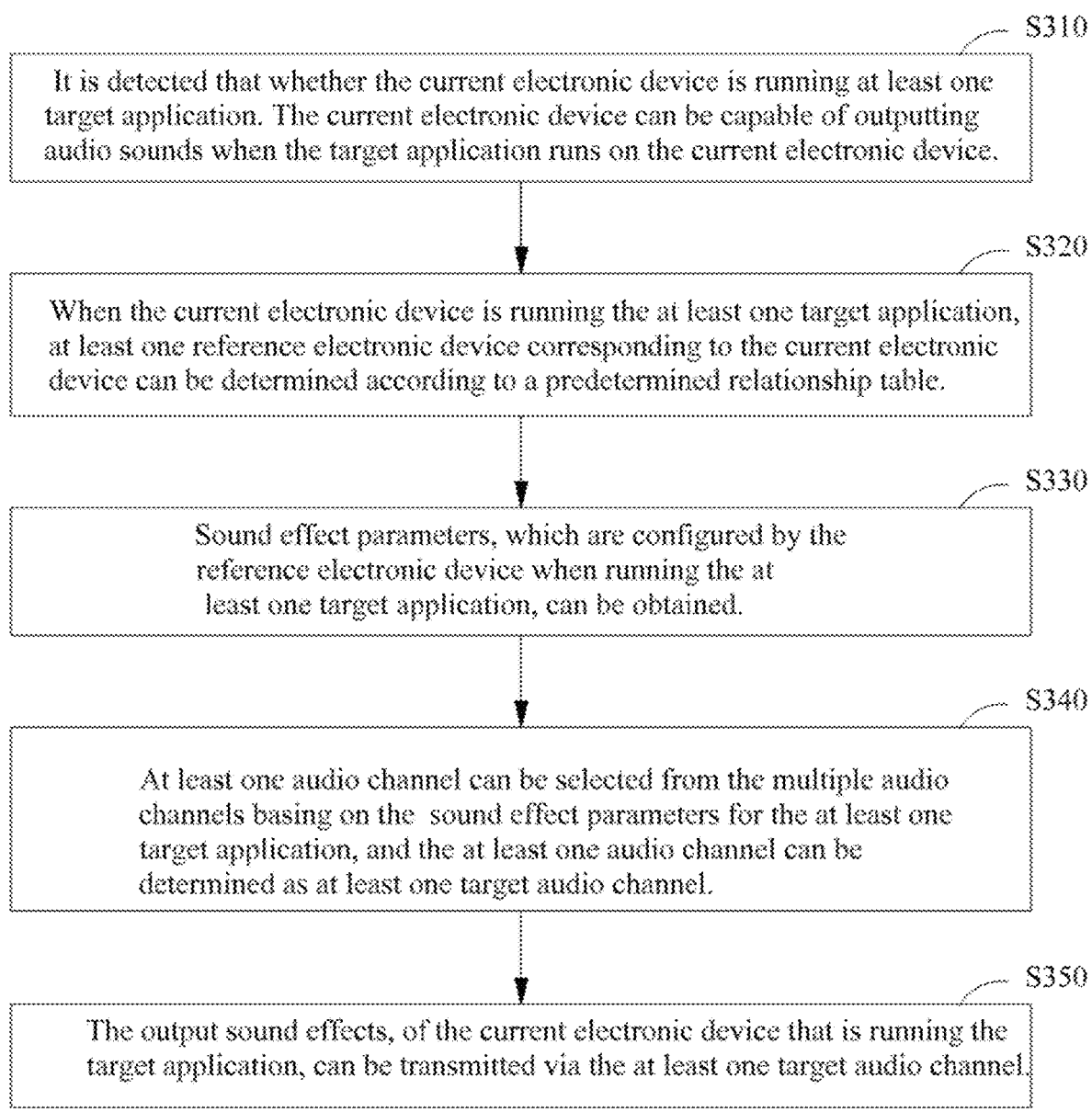
FIG. 6 illustrates a schematic flowchart of a sound effect adjustment method, in accordance with still another embodiment of the present disclosure.

As illustrated in FIG. 6, FIG. 6 illustrates a schematic flowchart of a sound effect adjustment method, in accordance with still another embodiment of the present disclosure. The sound effect adjustment method is applied to the above-mentioned electronic device. In the illustrated embodiment, the current electronic device is provided with multiple audio channels. Each one of the multiple audio channels is configured with an audio effect processing algorithm that is different from audio effect processing algorithms of other audio channels. The following will elaborate on the operations illustrated in FIG. 6, and the sound effect adjustment method may begin at block S310.

At block S310, it is detected that whether the current electronic device is running at least one target application. The current electronic device can be capable of outputting audio sounds when the target application runs on the current electronic device.

The detail description of block S310 can refer to that illustrated in block S110, which will not be repeated here.

At block S320, when the current electronic device is running the at least one target application, at least one reference electronic device corresponding to the current electronic device can be determined according to a predetermined relationship table. The predetermined relationship table includes corresponding relationships of the current electronic device and the at least one reference electronic device.

In the illustrated embodiment, the electronic device can pre-create and store the predetermined relationship table. The predetermined relationship table can include corresponding relationships of the current electronic device and the at least one reference electronic device. That is, in the predetermined relationship table, different current different electronic devices may correspond to different reference electronic devices, as illustrated in Table 2. It is understandable that one current electronic device may correspond to one reference electronic device, or may correspond to multiple reference electronic devices, which is not limited here. The current electronic device and the reference electronic device can be manually associated with each other by the user, via, such as a same account information. For example, the current electronic device can belong to a child, and the reference electronic device can belong to a parent of the child, and the child and the parent may login the current electronic device and the reference electronic device via a same account, thus the current electronic device of the child and the reference electronic device of the parent can be associated with each other. For another example, the current electronic device can belong to a Party A, and the reference electronic device can belong to a Party B, etc., which are not limited here.

TABLE 2

| Current electronic device | Reference electronic device |
| --- | --- |
| C1 | D1 |
| C2 | D2 |
| C3 | D3 |

At block S330, sound effect parameters, which are configured by the reference electronic device when running the at least one target application, can be obtained.

At block S340, at least one audio channel can be selected from the multiple audio channels basing on the sound effect parameters for the at least one target application, and the selected at least one audio channel can be determined as at least one target audio channel.

At block S350, the output sound effects, of the current electronic device that is running the target application, can be transmitted via the at least one target audio channel.

The detail descriptions of block S330 to block S350, can refer to those illustrated in block S240 to block S260, which will not be repeated here.

In the sound effect adjustment method, in accordance with an embodiment of the present disclosure, it is detected that whether the current electronic device is running at least one target application. At least one reference electronic device corresponding to the current electronic device can be determined according to a predetermined relationship table when the current electronic device is running the at least one target application. The predetermined relationship table includes corresponding relationships of the current electronic device and the at least one reference electronic device. Sound effect parameters, which are configured by the reference electronic device when running the at least one target application, can be obtained. At least one audio channel can be selected from the multiple audio channels basing on the sound effect parameters, and the at least one audio channel can be determined as at least one target audio channel. The output sound effects, of the current electronic device that is running the target application, can be transmitted via the at least one target audio channel.

Compared with the sound effect adjustment method illustrated in FIG. 1, in the sound effect adjustment method provided by this embodiment, an electronic device that has been associated with the current electronic device can be determined as the at least one reference electronic device according to the predetermined relationship table. Such that the reference electronic device can be selected according to the user's wishes to improve the applicability of the sound effect adjustment method. And it is conveniently and quickly for adjusting the output sound effects by providing different audio channels with different sound effect processing algorithms.

Figure 7:
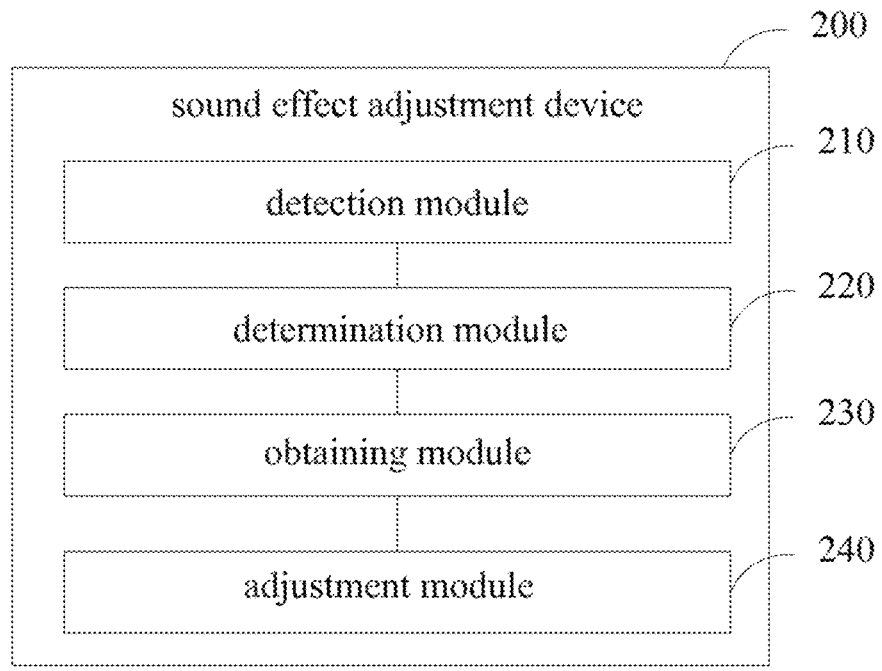
FIG. 7 illustrates a schematic block diagram of a sound effect adjustment device, in accordance with an embodiment of the present disclosure.

As illustrated in FIG. 7, FIG. 7 illustrates a block diagram of a sound effect adjustment device 200, in accordance with an embodiment of the present disclosure. The sound effect adjustment device 200 is applied to the above-mentioned electronic device. The following will elaborate on the block diagram illustrated in FIG. 7, the sound effect adjustment device 200 includes: a detection module 210, a determination module 220, an obtaining module 230, and an adjustment module 240.

The detection module 210 is configured to detect whether at least one target application is running on a current electronic device. The current electronic device is capable of outputting audio sounds when the target application runs on the current electronic device.

The determination module 220 is configured to determine at least one reference electronic device corresponding to the current electronic device when the current electronic device is running the target application. Further, the determination module 220 includes a location information obtaining submodule and a determination submodule.

The location information obtaining submodule is configured to obtain current location information of the current electronic device when the current electronic device is running the target application.

The determination submodule is configured to obtain one or more other electronic devices spaced from the current electronic device within a predetermined range, basing on the current location information, and determine the one or more other electronic devices as the at least one reference electronic device. Further, when the number of the other electronic devices is more than one, the determination submodule may include a determining unit, a decision unit, and a distance obtaining unit The determining unit is configured to determine whether the multiple other electronic devices include any electronic device that is running the at least one target application.

The decision unit is configured to determine at least one electronic device that is running the at least one application as the at least one reference device when the multiple other electronic devices include at least one electronic device that is running the at least one target application.

The distance obtaining unit is configured to obtain one or more of the multiple other electronic devices, which are closest to the current electronic device.

The decision unit is further configured to determine the one or more electronic device of the multiple other electronic devices, which are closest to the current electronic device, as the at least one reference device.

When the current electronic device is running the at least one target application, the determination submodule is further configured to determine at least one reference electronic device corresponding to the current electronic device according to a predetermined relationship table. The predetermined relationship table includes corresponding relationships of the current electronic device and the at least one reference electronic device.

The obtaining module 230 is configured to acquire sound effect parameters that are configured by the reference electronic device when running the at least one target application.

Further, the obtaining module 230 may include a type obtaining submodule, a sound effect parameter obtaining submodule, and a sound effect parameter determination submodule, wherein:

The type obtaining submodule is configured to obtain a type of the target application can be obtained when the reference electronic device has not ever run the target application.

The sound effect parameter obtaining submodule is configured to obtain one or more other applications whose types are the same as the type of the target application, and acquire sound effect parameters configured by the reference electronic device when running the other applications is obtained.

The sound effect parameter determination submodule is configured to determine the sound effect parameters, which are configured by the reference electronic device when the reference electronic device is running the one or more other applications, as the sound effect parameters configured by the reference electronic device when the reference electronic device is running the target application.

The adjustment module 240 is configured to adjust output sound effects of the current electronic device when the current electronic device is running the target application according to the sound effect parameter. Further, the current electronic device is provided with multiple audio channels. Each one of the multiple audio channels is configured with an audio effect processing algorithm that is different from audio effect processing algorithms of other audio channels. The adjustment module 240 may include a selection submodule and a transmission submodule.

The selection submodule is configured to select at least one audio channel the multiple audio channels basing on the sound effect parameters for the at least one target application, and determine the selected at least one audio channel as at least one target audio channel.

The transmission submodule is configured to transmit the output sound effects of the current electronic device that is running the target application via the at least one target audio channel.

Those skilled in the art can clearly understand that, for the convenience and conciseness of the description, the specific operations of the device and module described above can refer to the corresponding operations in the foregoing method according to the above embodiments, which will not be repeated here.

In the several embodiments provided in present disclosure, the coupling between the modules may be electrical, mechanical or other forms of coupling.

In addition, each functional module in each embodiment of the present disclosure may be integrated into one functional module, or each functional module may exist independently in physical, or two or more functional modules may be integrated into one functional module. The above-mentioned integrated functional modules can be implemented in the form of hardware or software functional modules.

The sound effect adjustment device provided by the embodiments of the present disclosure includes a detection module, a determination module, an obtaining module, and an adjustment module. The detection module is configured to detect whether at least one target application is running on a current electronic device. The determination module is configured to determine at least one reference electronic device corresponding to the current electronic device when the current electronic device is running the target application. The obtaining module is configured to acquire sound effect parameters that are configured by the reference electronic device when running the at least one target application. The adjustment module is configured to adjust output sound effects of the current electronic device when the current electronic device is running the target application according to the sound effect parameter. Therefore, the output sound effects of the current electronic device can be adjusted according to the sound effect parameters of the reference electronic device that in a corresponding relationship of the current electronic device. So that the output sound effects of the electronic device can be configured quickly, automatically and accurately, and the effect of the output sound effects and the user experience can be improved.

Figure 8:
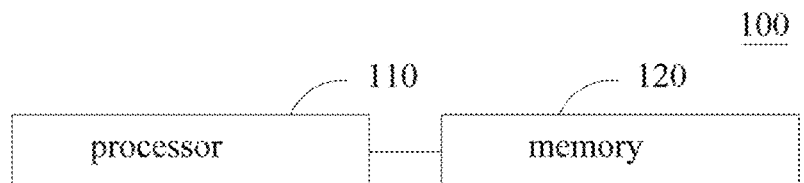
FIG. 8 illustrates a block diagram of an electronic device that is configured to perform the sound effect adjustment method, in accordance with an embodiment of the present disclosure.

As illustrated in FIG. 8, FIG. 8 illustrates a structural block diagram of an electronic device 100, in accordance with an embodiment of the present disclosure. The electronic device 100 may be an electronic device capable of running applications, such as a smart phone, a tablet computer, or an e-book. The electronic device 100 in the present disclosure may include one or more of the following components: a processor 110, a memory 120, and one or more applications. The one or more applications may be stored in the memory 120 and configured to be executed by one or more processors 110, to perform the method described in the foregoing embodiments.

The processor 110 may include one or more processing cores. The processor 110 connects various components of the entire electronic device 100 via various interfaces and lines, and performs the functions of the electronic device 100 and process data, by running or executing instructions, programs, code sets, or instruction sets stored in the memory 120, and calling data stored in the memory 120. Optionally, the processor 110 may be achieved by employing hardware such as at least one of Digital Signal Processing (DSP), Field-Programmable Gate Array (FPGA), and Programmable Logic Array (PLA). The processor 110 may be integrated with one or a combination of a central processing unit (Central Processing Unit, CPU), a graphics processing unit (Graphics Processing Unit, GPU), and a modem. The CPU mainly processes the operating system, user interface, and applications. The GPU is used for rendering and drawing of display content. The modem is used for processing wireless communication. It can be understood that the above-mentioned modem may not be integrated into the processor 110, but may be implemented by a communication chip alone.

The memory 120 may include a random access memory (RAM), or may include a read-only memory. The memory 120 may be used to store instructions, programs, codes, code sets or instruction sets. The memory 120 may include a program storage area and a data storage area, where the program storage area may store instructions for implementing the operating system and instructions for implementing at least one function (such as touch function, sound playback function, image playback function, etc.), Instructions for implementing methods provided by the embodiments of the present disclosure, etc. The storage data area can also store data created by the terminal 100 during use (such as phone book, audio and video data, chat record data), and the like.

Figure 9:
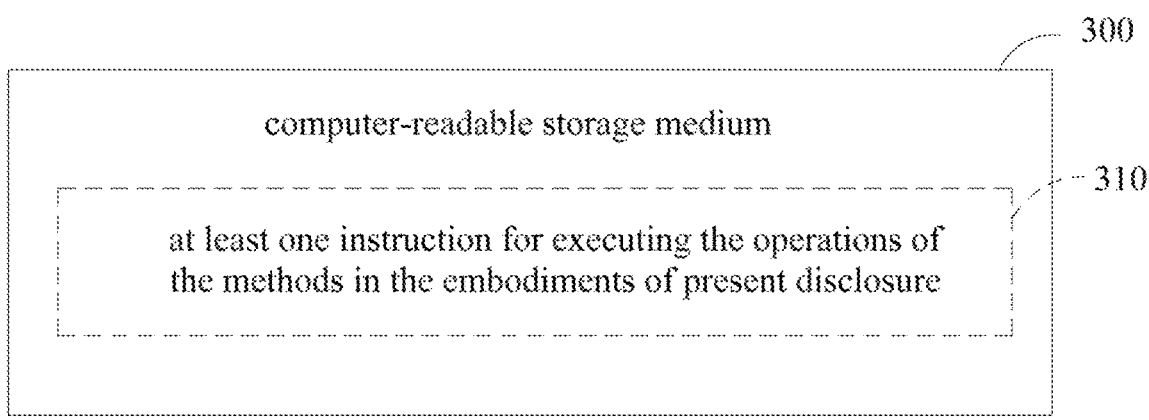
FIG. 9 illustrates a computer-readable storage medium for storing or carrying program codes for performing the sound effect adjustment method, in accordance with an embodiment of the present disclosure.

As illustrated in FIG. 9, which illustrates a structural block diagram of a computer-readable storage medium, in accordance with an embodiment of the present disclosure. The computer readable medium 300 stores at least one instruction, and the at least one instruction can be loaded and executed by a processor to perform the methods described in the foregoing embodiments.

The computer-readable storage medium 300 may be an electronic memory such as flash memory, electrically erasable programmable read only memory (EEPROM), EPROM, hard disk, or ROM. Alternatively, the computer-readable storage medium 300 includes a non-transitory computer-readable storage medium. The computer-readable storage medium 300 has storage space for the at least one instruction 310 for executing the operations of the methods in the above-mentioned embodiments. The at least one instruction can be read out from or written into one or more computer program products. The instruction 310 may be compressed in a suitable form, for example.

In some embodiments, the electronic device may be a portable media device. The electronic device may include an audio output module, a first memory module for storing a plurality of sound effects, computer program code for determining when to output at least one of the sound effects, and a processor for determining when to output at least one of the sound effects and for processing the at least one of the sound effects to produce output sound effects data for the audio output module.

In some embodiments, the electronic device may include a processor, an audio output module, coupled to the processor, and a memory coupled to the processor. The memory stores at least one instruction; the at least one instruction is executable by the processor to perform the method including: detecting whether at least one target application is running on a current electronic device, wherein the current electronic device is capable of outputting audio sounds when the target application runs; determining at least one reference electronic device corresponding to the current electronic device when running the target application; acquiring sound effect parameters configured by the reference electronic device when running the target application; adjusting, basing on the sound effect parameters, a sound effect data for output sound effects to be output by the current electronic device that is running the target application; and outputting the sound effect data for the output sound effects to the audio output module of the current electronic device. The operations in the method illustrated in this embodiment can refer to the same or similar operations in the methods illustrated in the above embodiments, which are not repeated.

In summary, in the sound effect adjustment method, device, electronic device, and storage medium provided by the embodiments of the present disclosure, it is detected that whether the current electronic device is running at least one target application. The current electronic device can be capable of outputting audio sounds when the target application runs on the current electronic device. At least one reference electronic device corresponding to the current electronic device may be determined when the current electronic device runs the at least one target application. Sound effect parameters, which are configured by the reference electronic device when running the at least one target application, can be obtained. Output sound effects of the current electronic device when running the target application can be adjusted according to the sound effect parameters of the reference electronic device. Therefore, the output sound effects of the current electronic device can be adjusted according to the sound effect parameters of the reference electronic device that in a corresponding relationship of the current electronic device. So that the output sound effects of the electronic device can be configured quickly, automatically and accurately, and the effect of the output sound effects and the user experience can be improved.

Finally, it should be noted that the above embodiments are only used to illustrate the technical solutions of the present disclosure, not to limit them. Although the present disclosure has been described in detail with reference to the foregoing embodiments, those of ordinary skill in the art should understand: the technical solutions recorded in the foregoing embodiments are modified, or some of the technical features thereof are equivalently replaced; these modifications or replacements do not drive the essence of the corresponding technical solutions to deviate from the spirit and scope of the technical solutions of the embodiments of the present disclosure. It should be noted that, for those of ordinary skill in the art, without departing from the concept of the present disclosure, several modifications and improvements can be made, which all belong to the protection scope of the present disclosure. Therefore, the protection scope of this disclosure patent shall be subject to the appended claims.

What is claimed is:

1. A sound effect adjustment method, applied to an electronic device, comprising:
    detecting whether current electronic device is running a target application, wherein the current electronic device is capable of outputting audio sounds when running the target application;
    determining at least one reference electronic device corresponding to the current electronic device when running the target application;
    acquiring sound effect parameters configured by the reference electronic device when running the target application;
    adjusting, based on the sound effect parameters, output sound effects of the current electronic device when running the target application;
    obtaining a type of the target application when the reference electronic device has not run the target application;
    obtaining at least one other application whose type is the same as the type of the target application;
    acquiring sound effect parameters configured by the reference electronic device when running the at least one other application; and determining the sound effect parameters, that is configured by the reference electronic device when running the other applications, as the sound effect parameters configured by the reference electronic device when the reference electronic device is running the target application.

2. The method of claim 1, wherein the current electronic device is provided with a plurality of audio channels corresponding to different audio effect processing algorithms; and the adjusting, based on the sound effect parameters, output sound effects of the current electronic device when running the target application, comprises:

selecting, based on the sound effect parameters, at least one audio channel from the audio channels as a target audio channel; and transmitting, via the target audio channel, a sound effect data for the output sound effects to be output by the current electronic device that is running the target application.

3. The method of claim 1, wherein the determining at least one reference electronic device corresponding to the current electronic device when running the target application, comprises:

obtaining current location information of the current electronic device when running the target application;

obtaining, based on the current location information, one or more other electronic devices spaced from the current electronic device within a predetermined range; and determining the one or more other electronic devices as the at least one reference electronic device.

4. The method of claim 3, wherein a number of the other electronic devices is more than one, the determining the one or more other electronic devices as the at least one reference electronic device, comprises:

determining whether the other electronic devices include at least one electronic device that is running the target application; and when the other electronic devices comprise at least one electronic device that is running the target application, determining the at least one electronic device that is running the target application as the at least one reference electronic device.

5. The method of claim 3, wherein a number of the other electronic devices is more than one, the determining the one or more other electronic devices as the at least one reference electronic device, comprises:

selecting, from the other electronic devices, a closest electronic device to the current electronic device; and determining the closest electronic device as the at least one reference electronic device.

6. The method of claim 3, wherein the obtaining, based on the current location information, one or more other electronic devices spaced from the current electronic device within a predetermined range, and determining the one or more other electronic devices as the at least one reference electronic device, comprises:

obtaining search times for information associated with the current location information, wherein the search times indicates a number of times that the information associated with the current location information is searched for, on the current electronic device or on a server that is in communication with the current electronic device;

when the search times is less than a predetermined number of times, determining a first predetermined threshold, obtaining one or more other electronic devices spaced from the current electronic device within a first predetermined range, and determining the one or more other electronic device as the at least one reference electronic device; and when the search times is greater than the predetermined number of times, determining a second predetermined range, obtaining one or more other electronic devices spaced from the current electronic device within the second predetermined range, and determining the one or more other electronic device as the at least one reference electronic device; wherein the first predetermined range is greater than the second predetermined range.

7. The method of claim 1, wherein the determining at least one reference electronic device corresponding to the current electronic device when running the target application, comprises:

when the current electronic device is running the target application, determining, based on a predetermined relationship table, the at least one reference electronic device corresponding to the current electronic device, wherein the predetermined relationship table comprises a corresponding relationship of the current electronic device and the reference electronic device.

8. The method of claim 1, wherein the target application is associated with an original audio data when operating; and the adjusting, based on the sound effect parameters, output sound effects of the current electronic device when running the target application, comprises:

modifying a sound effect data for output sound effects based on the sound effect parameters and the original audio data, the output sound effects being to be output by the current electronic device when running the target application;

mixing the modified sound effect data and the original audio data to obtain an output data; and outputting the output data to an audio output module of the current electronic device.

9. The method of claim 1, wherein the determining at least one reference electronic device corresponding to the current electronic device when running the target application, comprises:

determining whether the current electronic device is outputting audio sounds when running the target application; and determining the at least one reference electronic device corresponding to the current electronic device when outputting audio sounds.

10. The method of claim 1, wherein the acquiring sound effect parameters configured by the reference electronic device when running the target application, comprises:

judging whether the reference electronic device is running the target application; and acquiring sound effect parameters currently configured by the reference electronic device when running the target application.

11. The method of claim 10, further comprising:

when the reference electronic device is not running the target application, acquiring sound effect parameters that were previously configured by the reference electronic device when the target application was running a last time on the reference electronic device.

12. The method of claim 1, wherein the acquiring sound effect parameters configured by the reference electronic device when running the target application, comprises:

acquiring historical sound effect parameters configured by the reference electronic device when the reference electronic device was running the target application; and obtaining, based on the historical sound effect parameters, the sound effect parameters that are most frequently configured by the reference electronic device.

13. The method of claim 1, wherein the target application comprises at least one of a group of a music player application, a video player application, a call application, and a game application; and the adjusting, based on the sound effect parameters, output sound effects of the current electronic device when running the target application, comprises:

adjusting sound effect data for output sound effects based on the sound effect parameters, the output sound effects being to be output by the current electronic device when running the target application; and outputting the sound effect data to an audio output module of the current electronic device.

14. An electronic device, comprising:
a processor;
an audio output module, coupled to the processor; and
a memory coupled to the processor;
wherein the memory stores at least one instruction; the at least one instruction is executable by the processor to perform a method comprising:
detecting whether a current electronic device is running a target application, wherein the current electronic device is capable of outputting audio sounds when running the current electronic device;
determining at least one reference electronic device corresponding to the current electronic device when running the target application;
obtaining sound effect parameters configured by the reference electronic device when running the target application;
acquiring, based on the sound effect parameters, sound effect data for output sound effects to be output by the current electronic device that is running the target application; and
outputting the sound effect data for the output sound effects to the audio output module;
wherein the target application is associated with an original audio data when operating; and
wherein adjusting, based on the sound effect parameters, output sound effects of the current electronic device when running the target application, comprises:
modifying a sound effect data for output sound effects based on the sound effect parameters and the original audio data, the output sound effects being to be output by the current electronic device when running the target application;
mixing the modified sound effect data and the original audio data to obtain an output data: and
outputting the output data to an audio output module of the current electronic device.

15. The electronic device of claim 14, wherein the determining at least one reference electronic device corresponding to the current electronic device when running the target application, comprises:
obtaining current location information of the current electronic device when running the target application;
obtaining, based on the current location information, one or more other electronic devices spaced from the current electronic device within a predetermined range; and determining the one or more other electronic devices as the at least one reference electronic device.

16. The electronic device of claim 15, wherein a number of the other electronic devices is more than one, the determining the one or more other electronic devices as the at least one reference electronic device, comprises:
determining whether the other electronic devices include at least one electronic device that is running the target application; and
when the other electronic devices comprise at least one electronic device that is running the target application, determining the at least one electronic device that is running the target application as the at least one reference electronic device.

17. The electronic device of claim 15, wherein the obtaining, based on the current location information, one or more other electronic devices spaced from the current electronic device within a predetermined range, and determining the one or more other electronic devices as the at least one reference electronic device, comprises:
obtaining search times for information associated with the current location information, wherein the search times indicates a number of times that the information associated with the current location information is searched for, on the current electronic device or on a server that is in communication with the current electronic device;
when the search times is less than a predetermined number of times, determining a first predetermined threshold, obtaining one or more other electronic devices spaced from the current electronic device within a first predetermined range, and determining the one or more other electronic device as the at least one reference electronic device; and
when the search times is greater than the predetermined number of times, determining a second predetermined range, obtaining one or more other electronic devices spaced from the current electronic device within the second predetermined range, and determining the one or more other electronic device as the at least one reference electronic device; wherein the first predetermined range is greater than the second predetermined range.

18. A non-transitory computer readable medium comprising program instructions for causing an electronic device to perform at least the following:
detecting whether current electronic device is running a target application, wherein the current electronic device is capable of outputting audio sounds when running the target application;
determining at least one reference electronic device corresponding to the current electronic device when running the target application;
acquiring sound effect parameters configured by the reference electronic device when running the target application; and
adjusting, based on the sound effect parameters, output sound effects of the current electronic device when running the target applications;
wherein the current electronic device is provided with a plurality of audio channels corresponding to different audio effect processing algorithms; and
wherein the adjusting, based on the sound effect parameters, output sound effects of the current electronic device when running the target application, comprises:
selecting, based on the sound effect parameters, at least one audio channel from the audio channels as a target audio channel; and transmitting, via the target audio channel, a sound effect data for the output sound effects to be output by the current electronic device that is running the target application.

\* \* \* \* \*